United States Patent [19]

Icard

[11] Patent Number: 4,625,599
[45] Date of Patent: Dec. 2, 1986

[54] HALF-INCH LUG LOCK KEY

[76] Inventor: Charles R. Icard, 10345 Newport Dr., El Paso, Tex. 79924

[21] Appl. No.: 757,265

[22] Filed: Jul. 22, 1985

[51] Int. Cl.$^4$ .............................................. B25B 23/00
[52] U.S. Cl. ........................................ 81/461; 81/438; 81/124.2
[58] Field of Search ....................... 81/461, 438, 124.2

[56] References Cited

U.S. PATENT DOCUMENTS

| | | | |
|---|---|---|---|
| 1,268,282 | 6/1918 | Royer | 81/438 |
| 3,106,862 | 10/1963 | Briles | 81/461 |
| 3,312,260 | 4/1967 | MacNeill | 81/438 |
| 3,821,975 | 7/1974 | Haker | 81/461 |

FOREIGN PATENT DOCUMENTS

| | | | |
|---|---|---|---|
| 480235 | 4/1953 | Italy | 81/461 |
| 556145 | 9/1943 | United Kingdom | 81/461 |

*Primary Examiner*—Frederick R. Schmidt
*Assistant Examiner*—Joseph T. Zatarga
*Attorney, Agent, or Firm*—Charles R. Icard

[57] ABSTRACT

This invention is a one-half inch member sandwiched between an extension key adapter and a combination lug lock, and means for snap fitting together so to convert different size drives to a one-half inch drive.

1 Claim, 8 Drawing Figures

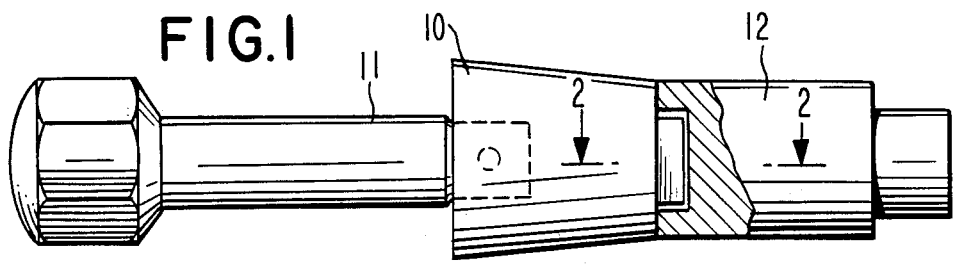
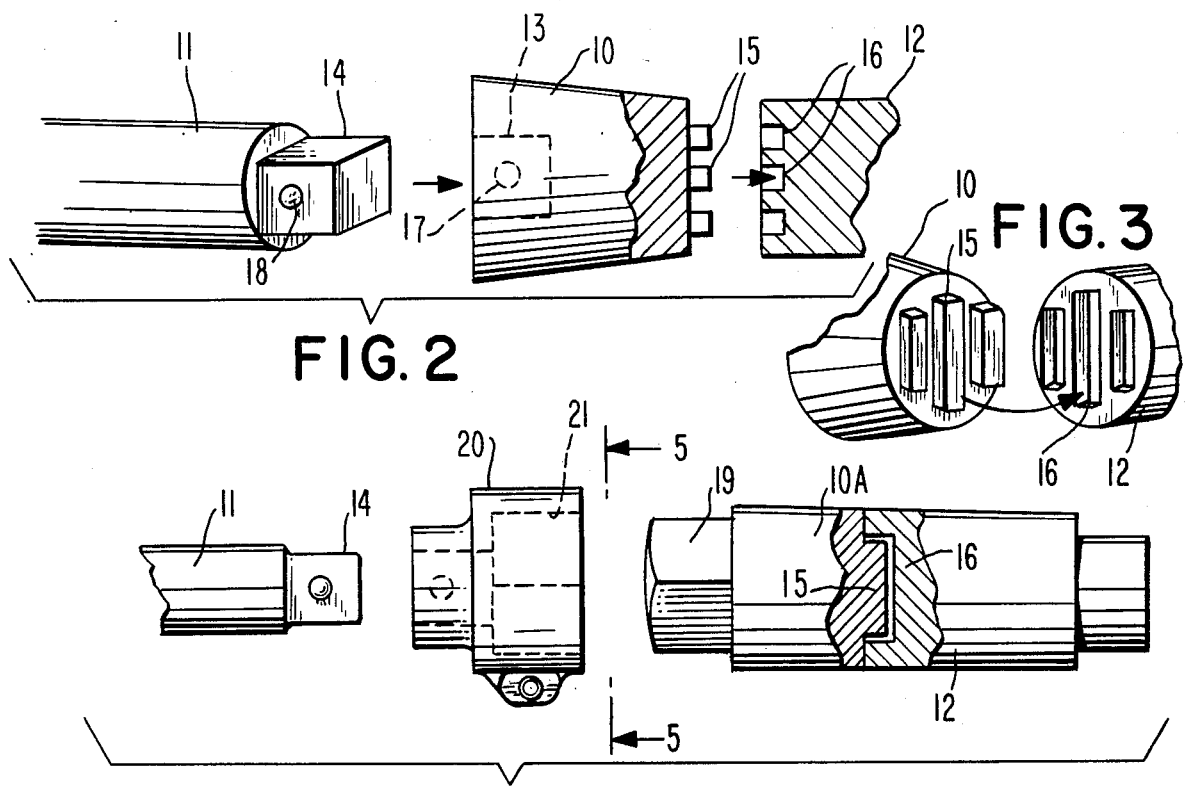
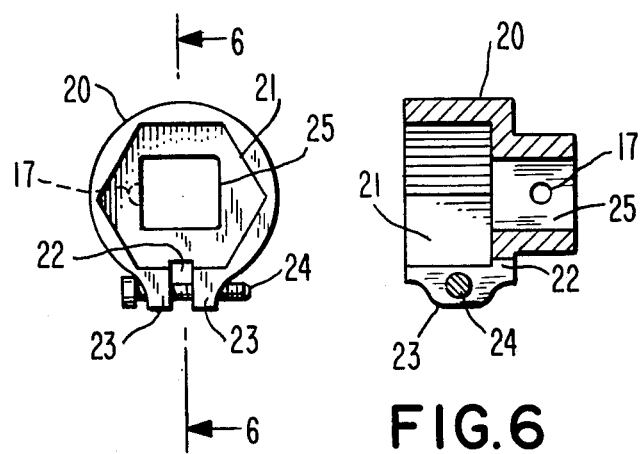
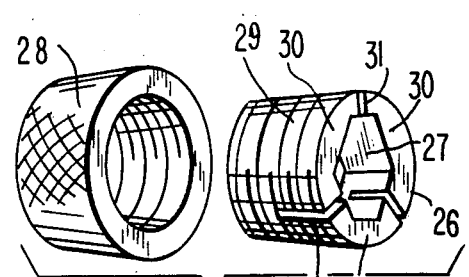
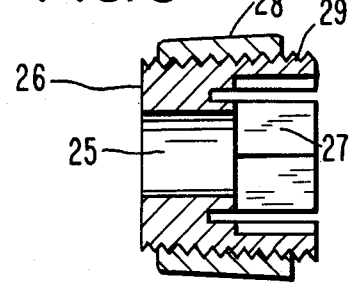

HALF-INCH LUG LOCK KEY

BACKGROUND OF THE INVENTION

1. Field of the Invention

This invention relates generally to automotive accessories. More specifically, it relates to wheel rim locking keys.

2. Description of Prior Art

It is well known to those persons acquainted with the field of automobile servicing, that there is at this time a substantial thievery of aftermarket wheel rims and factory-made aluminum rims. Lug and key locks presently used today require a socket to fit over a bolt head type combination key. This means that when a person uses it, the socket that is used is usually too deep. Accordingly, it is a practice of many service mechanics, when tire-busting, to stuff things down inside the socket in order to keep the key tip outside of the socket end, and also to allow the application of more pressure or leverage when removing or torquing lug locks. This situation is objectionable, and is therefore, in need of an improvement.

Accordingly, it is a principal object of the present invention to provide a one-half inch lug lock key that would make existing designs not worth producing, by helping to prevent the theft of aftermarket rims and factory aluminum rims, and which is accomplished by being made to work for snapping into a drive breaker bar or pneumatic impact tool.

Another object is to provide a one-half inch lug lock key, which gives better leverage when removing or torquing a combination lug lock to a stud of an axle, while not requiring the above described socket.

Other objects are to provide a half-inch lug lock key, which is simple in design, inexpensive to manufacture, rugged in construction, easy to use, and efficient in operation.

These, and other objects, will be readily evident, upon a study of the following specification, and the accompanying drawing, wherein:

BRIEF DESCRIPTION OF THE DRAWINGS

FIG. 1 is a side elevational view of one design of the invention, and showing a key positioned between a key adapter and a combination lug lock:

FIG. 2 is a fragmentary cross-sectional view, taken on line 2—2 of FIG. 1, and showing the use of a drive breaker bar instead of the key adapter:

FIG. 3 is a side elevational view of another design of the invention which is to be used with or for, instead of all existing bolt head type lug keys:

FIG. 4 shows a design with an adapter to fit bolt head types of existing lock lug keys:

FIG. 5 is an end view, taken on line 5—5 of FIG. 4:

FIG. 6 is a cross-sectional view, taken on line 6—6 of FIG. 5:

FIG. 7 is a side cross-sectional view of yet another design of the invention, which, instead of the clamp bolt used in FIGS. 3 to 5, uses a knurlled clamping sleeve on a split socket, and FIG. 8 is an exploded perspective view of the knurlled clamping sleeve and the split socket.

DETAILED DESCRIPTION

Referring now to the drawing in greater detail, and more particularly to FIGS. 1 to 3 thereof at this time, the reference numeral 10 represents a one-half inch drive combination lug lock key 10 according to the present invention; the key being shown positioned between an extension key adapter 11 and a combination lug lock 12. The key is frusto-conical in shape and includes a square socket 13 in one end for receiving a square head 14 of the key adapter. A plurality of protruding, parallel key elements 15 on the key opposite end are adaptable for engagement within a plurality of parallel recesses 16 on one end of the combination lug lock. A hole or indentation 17 in a wall of the socket 13 serves to receive a detent 18 of the head 14.

The design, as best shown in FIG. 3, is to be used with or for, instead of all existing bolt head type lug keys.

Referring now to FIGS. 4 to 6, a modified design of key 10A has a hexagonal head 19 on one end instead of the above described socket 13. This design would be used with most all existing bolt head type lug keys. As shown, it is used with an adapter 20 having a hexagonal, adjustable socket 21 on one end so as to receive the head 19. The adapter has a split 22 so as to form a pair of jaws 23 that may clamp around the head 19 by means of a take up clamp screw 24 through the jaws. The opposite end of the adapter 20 has a fixed square socket 25 to receive the square head 14 of key adapter 11. Indentation 17 receives detent 18 thereof. After installation, the adapter 20 will serve to convert any drive size to a one-half inch drive for ease of operation. The key hexagonal head 19 is first inserted into the adapter socket 21 after which the transverse locking screw 24 is tightened so as to form a singular unit, while the other end fits a one-half inch drive breaker bar or impact pneumatic tool, with the resultant same advantages of the invention as has been indicated in the forms of the invention illustrated in FIGS. 1 and 2 hereabove.

In operative use, the present invention is made to work by taking a drive, such as is shown in FIG. 1, and snapping it to the one-half inch drive breaker bar or pneumatic impact tool, or else with the use of the drive which has been presented in FIG. 3 of the Drawing, if a factory-installed lug wrench such as is supplied on most vehicles, is being used.

Referring now to FIGS. 7 and 8, a modified design of adapter 26 differs from adapter 20 by including a hexagonal socket 27 on one end and which can be clamped on a hexagonal head by means of a frusto-conical nut 28 on a correspondingly shaped screw thread 29 around the adapter, thus compressing together the jaws 30 formed by means of slits 31 in one end of the adapter. The other end of the adapter has the fixed socket 25.

While various changes may be made in the detail construction, it is understood that such changes will be within the spirit and scope of the present invention, as is defined by the appended claims.

What I now claim is:

1. A one-half inch lug lock key assembly, comprising, in combination, a one piece key member positioned between an extension key adapter and a combination lug lock, and a second adapter being positioned between said key member and said extension key adapter for converting any drive size to a one-half inch drive; a plurality of parallel protrusions on a first end of said key member for engagement in slots on an end of said combination lug lock, said second adapter having a square socket on one end for engaging a square head on one end of said extension key adapter and a hexagonal socket on an opposite end for engaging a hexagonal head on an opposite end of said key member, said hexagonal socket being split longitudinally and forming a pair of jaws, and a clamping screw transversely through said jaws for forcibly tightening said split hexagonal socket around said key member hexagonal head.

* * * * *